(12) United States Patent
Czerwinski et al.

(10) Patent No.: US 8,726,297 B2
(45) Date of Patent: May 13, 2014

(54) SEARCH TOOL THAT AGGREGATES DISPARATE TOOLS UNIFYING COMMUNICATION

(75) Inventors: Mary P. Czerwinski, Woodinville, WA (US); Anoop Gupta, Woodinville, WA (US); Paul J. Hough, North Bend, WA (US); Pavel Curtis, Bellevue, WA (US); Richard J. McAniff, Bellevue, WA (US); Raymond E. Ozzie, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1516 days.

(21) Appl. No.: 11/770,662

(22) Filed: Jun. 28, 2007

(65) Prior Publication Data
US 2009/0007148 A1  Jan. 1, 2009

(51) Int. Cl.
*G06F 3/00* (2006.01)
*G06F 17/27* (2006.01)
*H04M 11/00* (2006.01)

(52) U.S. Cl.
USPC ..... 719/320; 719/315; 379/88.13; 379/88.14; 715/239; 715/249

(58) Field of Classification Search
CPC .......... H04W 4/12; H04W 4/18; G10L 15/22; G10L 15/26; G10L 21/00; H04M 2201/60; H04M 1/72552; H04M 2203/4536; H04M 2201/38; H04M 2203/253; G06F 3/00
See application file for complete search history.

(56) References Cited

U.S. PATENT DOCUMENTS

| | | | |
|---|---|---|---|
| 6,205,209 B1 | 3/2001 | Goldberg et al. | |
| 7,401,338 B1 * | 7/2008 | Bowen et al. | 719/320 |
| 7,426,540 B1 * | 9/2008 | Matsumoto et al. | 709/206 |
| 7,450,696 B2 * | 11/2008 | Vishik et al. | 379/88.13 |
| 7,509,649 B2 * | 3/2009 | Shenfield | 715/239 |
| 7,624,397 B1 * | 11/2009 | Washburn et al. | 719/315 |
| 8,312,148 B2 * | 11/2012 | Anthias et al. | 709/227 |
| 8,327,381 B2 * | 12/2012 | Borgendale et al. | 719/315 |
| 2002/0124057 A1 | 9/2002 | Besprosvan | |
| 2003/0028364 A1 * | 2/2003 | Chan et al. | 704/1 |
| 2004/0203664 A1 | 10/2004 | Lei et al. | |
| 2005/0198578 A1 * | 9/2005 | Agrawala et al. | 715/750 |
| 2005/0198612 A1 | 9/2005 | Gonzalez | |
| 2005/0210009 A1 * | 9/2005 | Tran | 715/512 |
| 2005/0268233 A1 * | 12/2005 | Perla et al. | 715/703 |

(Continued)

OTHER PUBLICATIONS

"Homer: a Voice-Driven Text-to-Speech system for the Blind", Dobrisek, 1999, pp. 1-4.*

(Continued)

*Primary Examiner* — Tuan Dao
(74) *Attorney, Agent, or Firm* — Holly Nguyen; Carole Boelitz; Micky Minhas

(57) ABSTRACT

A user entering information in an application might desire functionality not supported by that application. Based on an input or a subset of the input, a functionality associated with a different application can be automatically applied within a current application. Sometimes, a particular application or mode of communication can be used to send information and reply information can be sent in a different mode of communication. The communications can be automatically associated or related to each other. A user can be presented with information relating to both communications, upon request, although the communications might be associated with different modes of communication. Constraints or parameters can be placed on a subsequent communication by either a sender or a recipient.

20 Claims, 10 Drawing Sheets

(56) References Cited

U.S. PATENT DOCUMENTS

| | | |
|---|---|---|
| 2007/0044066 A1* | 2/2007 | Meijer et al. ............... 717/100 |
| 2007/0061296 A1 | 3/2007 | Burke et al. |
| 2007/0124374 A1 | 5/2007 | Arun et al. |
| 2007/0124397 A1* | 5/2007 | Ruckart ............... 709/206 |
| 2007/0260456 A1* | 11/2007 | Proux et al. ............... 704/235 |
| 2008/0063155 A1* | 3/2008 | Doulton ............... 379/88.14 |
| 2011/0214083 A1* | 9/2011 | Kang et al. ............... 715/780 |

OTHER PUBLICATIONS

"IBM WebSphere Voice Server 2.0 Implementation Guide", ibm, 2002, pp. 1-326.*

Susanne Hupfer, et al. Introducing Collaboration into an Application Development Environment. CSCW '04, Nov. 6-10, 2004, Chicago, Illinois, USA. ACM 1-58113-810-5/04/0011 http://delivery.acm.org/10.1145/1040000/1031611/p21-hupfer.pdf? key1=1031611 &key2=0564458811&coll=GUIDE&dl=GUIDE&CFID= 33532054&CFTOKEN=11528973. Last accessed Sep. 3, 2007, 4 pages.

Mikhail Simonov, et al. Ontology-driven Natural Language access to Legacy and Web services in the Insurance Domain http://www.loa-cnr.it/Papers/BIS_2004.pdf. Last accessed Sep. 3, 2007, 10 pages.

Microsoft Collaborative Applications Initiative https://www.washington.edu/computing/msca/. Last accessed Sep. 3, 2007, 4 pages.

Paul Degroot. Office Live Offers Simple Collaboration, Applications. Posted Dec. 18, 2006. http://www.directionsonmicrosoft.com/sample/DOMIS/update/2007/01jan/0107olosca.htm. Last accessed Sep. 3, 2007, 6 pages.

* cited by examiner

SEARCH TOOL THAT AGGREGATES DISPARATE TOOLS UNIFYING COMMUNICATION

BACKGROUND

Computing devices are commonly utilized to perform many functions that relate to both business uses and personal uses. Many people use such devices to perform common tasks, such as writing a document (e.g., letter, report, novel) or performing calculations in a spreadsheet application as well as numerous other tasks. Today, there is a growing trend for people to spend more time interacting with a computing device than they spend interacting with other people.

As it relates to communicating with others, various functions, such as instant message applications or email applications are generally used instead of calling a person on the telephone or physically going to see someone. Such information exchange can occur by a user entering information (e.g., text, visual, audio, and so on) into a display area of a user device and communicating with one or more other people in a back-and-forth manner. This almost instantaneous communication allows a user and various contacts in disparate locations (or even within the same office) to communicate in a real time fashion.

Utilizing functionalities across applications (such as email and spreadsheet applications) can generally only be performed through time-consuming manual tasks. For example, if a calculation is desired in an email, the calculation is performed manually using pen and paper or it is performed in another application, such as a spreadsheet application, and imported or copied into the email application. This can be frustrating and can waste time, which could be better spent performing other tasks, or allowing the user to have more leisure time.

In addition, if a conversation or other communication begins in a first format (e.g., email) and a response or later communication is sent in a different format (e.g., voice call) the communications might not be associated with each other for later retrieval purposes. Thus, important communications might be lost or the different modes of communication might make them difficult, if not impossible, to find when the communication is desired to be reviewed.

SUMMARY

The following presents a simplified summary in order to provide a basic understanding of some aspects of the disclosed examples. This summary is not an extensive overview and is intended to neither identify key or critical elements nor delineate the scope of such aspects. Its purpose is to present some concepts in a simplified form as a prelude to the more detailed description that is presented later.

In accordance with one or more examples and corresponding disclosure thereof, various aspects are described in connection with providing cross functionally across applications. A user can request functionality from an application not currently being used through entry of various inputs including natural language, a query or other formats. The functionally of a different application can be applied within the application that the user is currently using automatically and in a manner that is transparent to the user. This can mitigate the need for the user to manually open the other application, perform the desired function and copy or export the results of the function to the current application.

In accordance with some aspects, communications that occur within different application formats can be unified to provide a commonality between the communications. If a communication begins in a first format or application (e.g., telephone call) and a response or later communication is sent in a second format (e.g., instant message) there can be a linking or other association between the communications, even though in different formats. The communications relating to a common topic can be retained and cross-referenced to each other through the association making the communications on the topic easy to find and review.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the various aspects may be employed. Other advantages and novel features will become apparent from the following detailed description when considered in conjunction with the drawings and the disclosed examples are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Figure 1:
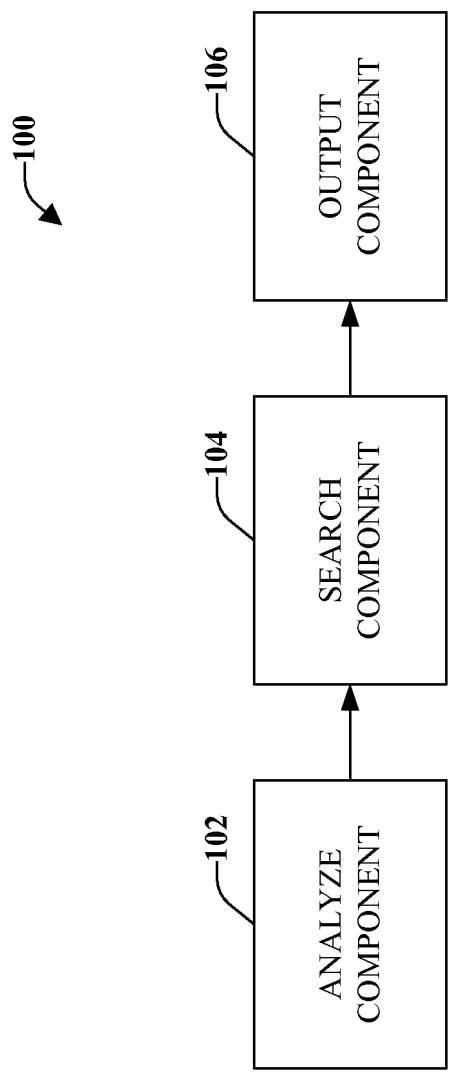
FIG. 1 illustrates an example system that facilitates transparent and seamless integration of functions between applications.

Referring initially to FIG. 1, illustrated is an example system 100 that facilitates transparent and seamless integration of functions between applications. When an individual is using a first application (e.g., word processing application, email, and so forth) and wants to implement a feature commonly associated with a second application, the user has to open the second application and transfer the results of the function to the first application. This can be frustrating, especially if the user does not know which application contains the desired function. It can also be time-consuming since the user has to search for the application in order to obtain the desired function. System 100 can automatically pull a function from a different application and allow the user to utilize the function without being aware that system 100 pulled the function from a different application.

System 100 includes an analyze component 102 that can be configured to separate an input into functions or commands. The input can be in various formats (e.g., voice, text and so forth) and can be bidirectional. That is to say, the input can be received from a sender and/or a recipient of a communication.

Many of the received inputs can relate to functions associated with a current application (e.g., instant message application, spreadsheet application, email, and so forth). However, one or more of the inputs might relate to a function or command that is not supported by the current application. For example, a user might be entering text in a word processing application. A next action might be the input "4*8". Analyze component 102 can recognize that the input might be a request for a math function and can notify search component 104 of the request. In accordance with some aspects, analyze component 102 confirms whether the input is a request for a certain function (e.g., mathematical equation) or whether the input is an entry intended to be applied by the current application. The confirmation can be from a user and/or entity (e.g., the Internet, another system, a computer, and so forth), hereinafter referred to as user.

Search component 104 can be configured to discover an application that can support and/or implement the function (e.g., thesaurus, algorithm, directory) requested by the input. Search component 104 can seek an application on the user's device, on a network, over the Internet or any other place accessible by search component 104. For example, search component 104 can begin by searching for various programs on the user's device that might be able to perform the function. If the program is not found within the device, search component 104 can dynamically expand the search (e.g., network, Internet) until the desired function is found and available for use by system 100 (e.g., not cost prohibitive).

At substantially the same time as the function is discovered it can be applied to the input or a portion of the input as determined by analysis component 102. The results of the input or portions of the input with the command applied can be presented to the user by output component 106. System 100 can implement the desired function seamlessly so that the user is not aware nor does the user need to be aware that the function is from a different application.

In accordance with some aspects, system 100 can be configured to unify communications that occur in different applications. For example, a first user can send an instant message to a second user. To reply to the instant message, the second user might decide to call the first user over the telephone because of sensitivity of the message or for other reasons. System 100 can be configured to track both the instant message and the telephone call and link the communications together. Later when one of the users, or a different user, desires to review certain aspects of the communication, it can be dynamically presented as a single thread or link.

In accordance with this aspect, analyze component 102 can be configured to associate a first communication with subsequent communications that can be related to the first communication or which might be a new communication unrelated to previous communications. If related, the information can be linked together, such as through an identifier or other means of associating the communications with each other. When a user desires to review aspects of the conversation (e.g. a single communication), search component 104 can be configured to gather the disparate communication sources and the entire communication link or thread can be presented to the user by output component 106. Thus, the user can be presented with an entire communication thread and view or hear the conversation in its various formats (e.g., audio, video, text and so forth).

Figure 2:
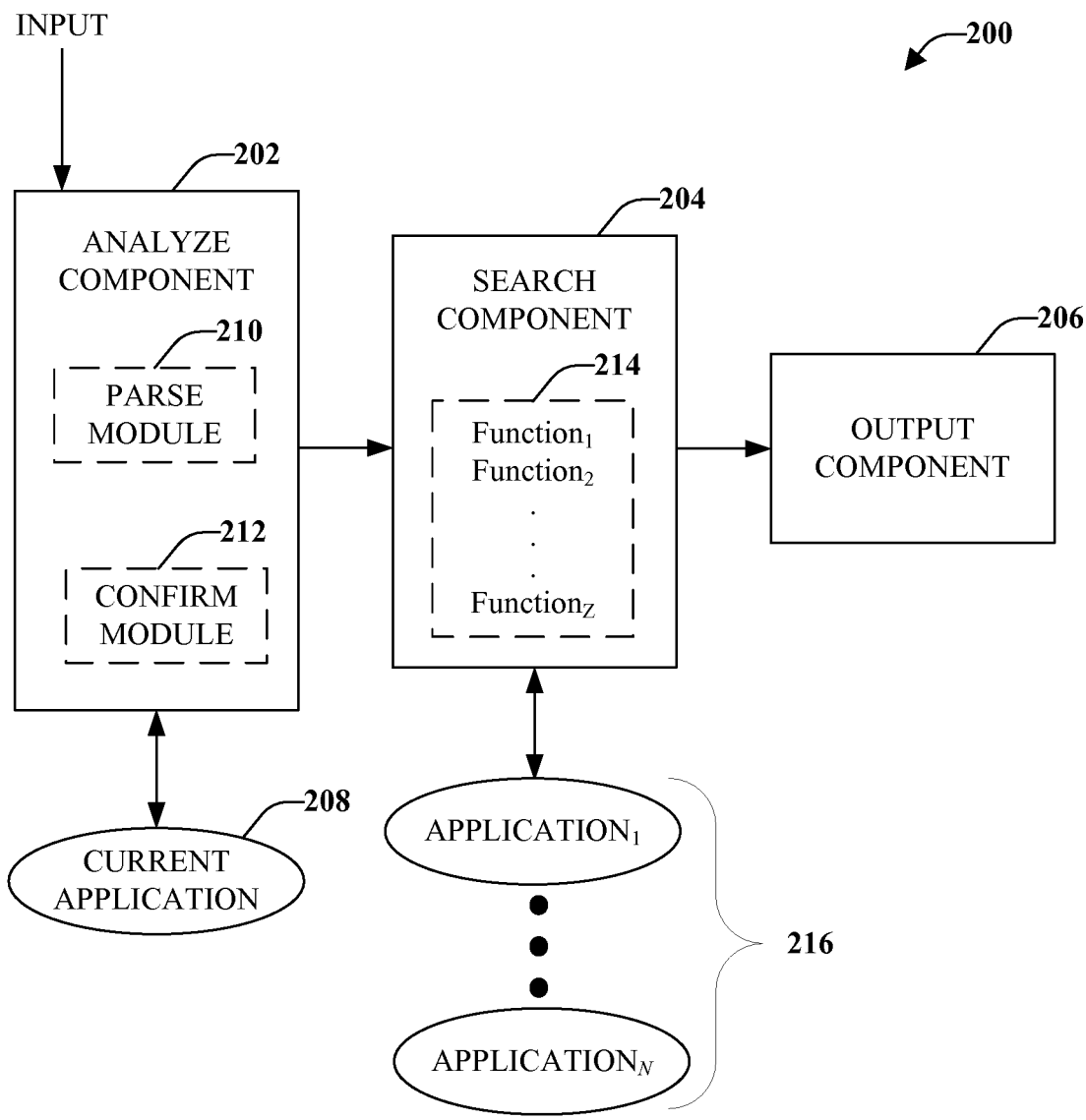
FIG. 2 illustrates another example system that can apply functions across computing applications.

FIG. 2 illustrates another example system 200 that can apply functions across computing applications. As a user is entering information in a computing device, various applications can provide different functions. When a user is using an application, it might be desired to utilize a functionality that is not available in the currently used application. System 200 can be configured to automatically retrieve the desired functionality from one or more different applications and dynamically allow the user to utilize the functionality in the current application. In accordance with some aspects, system 200 can automatically apply the function to the input.

System 200 is similar to the system illustrated and described with reference to the above figure. Included is an analyze component 202 that receives an input that might include a function not supported by a current application. If the function is not supported, a search component 204 can obtain the function from a different application and the result can be presented to a user by output component 206.

In further detail, analyze component 202 can receive an input and make a determination whether the input includes a request for a function not supported within a current application 208 that the user has invoked. To facilitate the determination, analyze component 202 can include a parse module 210 that can be configured to evaluate sub-components of the received input. Parse module 210 can recognize inputs or sub-portions of the inputs that are supported by the current application 208 and inputs (or sub-portions) that are not supported by the current application 208.

If the input is supported, the input is applied within the application and a next input is analyzed. If the input is not supported, a search component 204 can be invoked to find one or more other applications that support the function requested by the input. Search component 204 might contain a listing of applications 214 and their various functions. The functions contained in the listing can relate to functions that are available within the device and/or functions that can be obtained outside the device (e.g., on a network, over the Internet, and so forth). Search component 204 can correspond a requested function with its application and the application's location (as provided by the listing 214) and seamlessly access one or more applications that provide the desired function. As illustrated, system 200 can be associated with 1 to N applications, where N is an integer. Applications 1 to N can be referred to individually or collectively as applications 216 and can perform different or similar functions. The applications 216 can be included within a device or can be accessed external to the device.

In accordance with some aspects, analyze component 202 includes a confirm module 212 that can be configured to verify whether analysis of an input is correct. For example, an input can be received that includes "The correct detailed answer should include 17/23*9". Analyze component 202 might not be able to tell whether the input is a mathematical equation or whether the input, as received, should be applied to the current application. In this situation, confirm module 212 can display to the user a prompt or other notification asking what action the user intends. The user can answer the prompt by selecting a "yes" or "no" response or through another interaction (e.g., turning off capabilities of system 200, requesting system 200 to ignore inputs, and so forth). To mitigate the need to receive confirmations from a user, a query or formula input strategy can be utilized as will be discussed with reference to the next figure.

Figure 3:
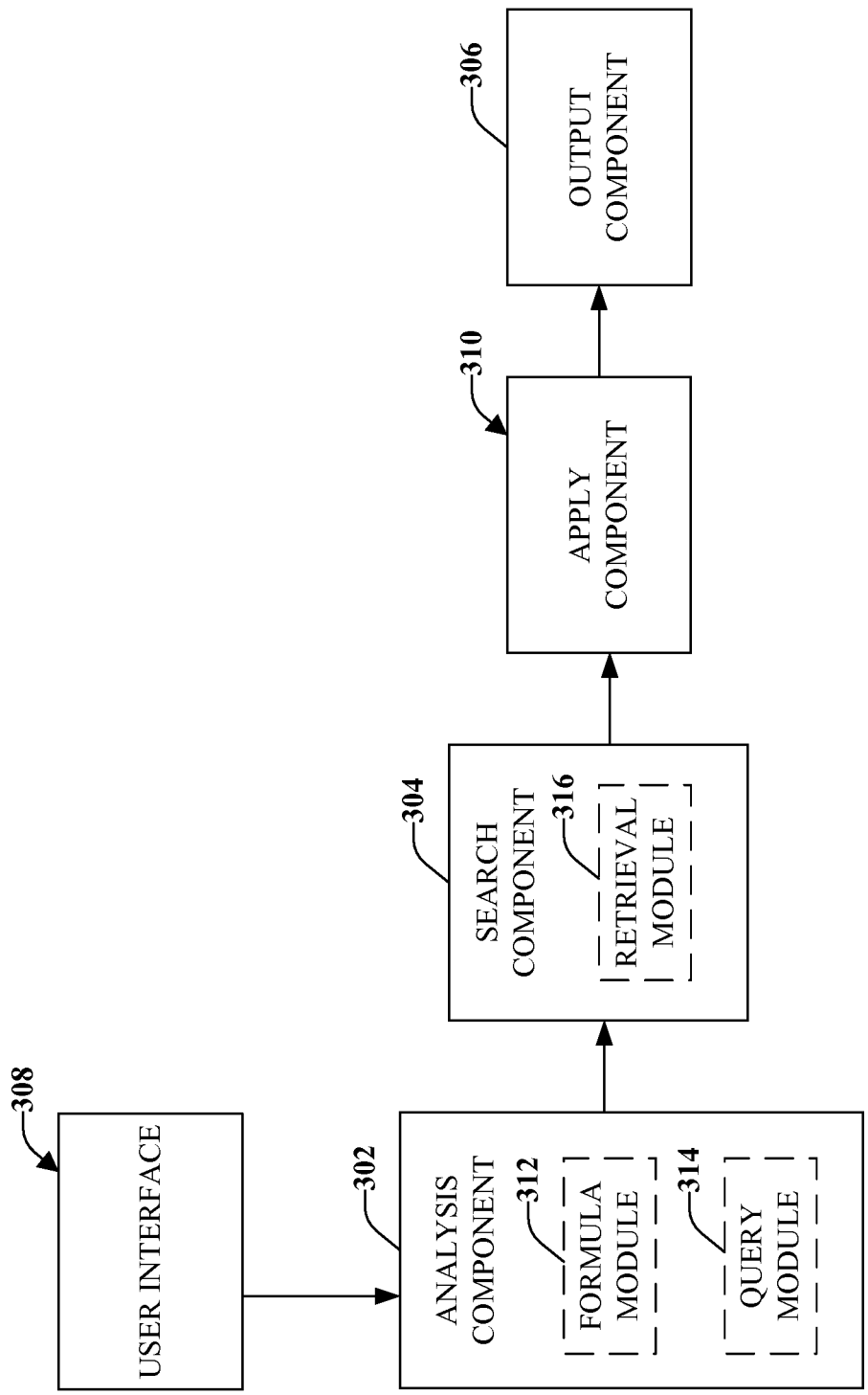
FIG. 3 illustrates another example system for dynamically utilizing functionalities across applications to provide a rich user experience.

FIG. 3 illustrates another example system 300 for dynamically utilizing functionalities across applications to provide a rich user experience. As a user interacts with system 300 there might be operations that the user desires to perform, however, the program currently being used might not have the capabilities to perform the desired operation. In some situations, the user might not be aware of which program can provide the function, and therefore cannot complete the desired task without system 300 interaction. System 300 can seamlessly perform functions the user desires and can mitigate the need for the user to be aware of the available programs and associated functions.

A user can interact with system 300 by entering an input that can be received by an analysis component 302. The input can be received from the user through a user interface 308, which can be, but is not limited to being, a keyboard, a mouse, a pressure-sensitive screen, a graphical user interface, a microphone, voice recognition software or combinations thereof. Further information about the user interface 308 will be provided below. As various inputs are received, the inputs can be applied directly in a current application and output to the user through an output component 306, which can be a display or screen on the user device, a speaker, other perceivable means, or combinations thereof.

There may be some inputs or portions of inputs that indicate that the user desires various functionalities to be performed, which may or may not be supported by the current application. For example, if the user is in a spreadsheet application and would like to include a letter or memo with the spreadsheet, the user might begin typing words and sentences. Analysis component 302 can determine that the user has switched from utilizing the spreadsheet operation and is inputting commands or keystrokes that relate to a word processing application. The desired commands can be communicated to a search component 304 that can be configured to dynamically discover an application that can perform the desired command. Search component 304 can access both internal and external programs and might retain a listing or cross-reference of various functions and programs that are configured to provide those functions.

At substantially the same time as the application is found by search component 304, an apply component 310 can selectively apply the function to the portion of the current application to which the input, or sub-portion of the input, relates. Apply component 310 can selectively pull the functionality from one or more other applications in order to carry out the desired action. Embedded within the current application may be information or functionalities supported by a different application. In accordance with some aspects, the information and/or functionalities are retained within a current application separately from the other applications. That is to say, once the functionality is included in the current application, the other applications might no longer be relied upon to perform the functionalities. However, if changes are made to that portion of the document, search component 304 and apply component 310 can perform an operation similar to that described above to implement the changes.

In accordance with some aspects, analysis component 302 can be configured to recognize certain functions or queries that can be received from a user interface 308. A user can enter a character or string of characters that can be interpreted by analysis component 302 as a request to implement a function. To interpret the characters or string of characters a formula module 312 and/or a query module 314 can be associated with analysis component 302.

Formula module 312 can be configured to receive various user-assigned functions. For example, a user might utilize a formula or other operation repeatedly. The user can program or provide formula module 312 with the information relating to the operation and, when characters associated with that formula are received within the input, formula module 312 can interpret the characters as a command to invoke a particular formula.

Query module 314 can be configured to interpret a query in the received input as a command to perform a particular operation. For example, a user entering information in an email might desire to perform a quick function to tell someone how much money was made selling their paintings. The user might enter "I sold 10 paintings and made sum 10*$20". Query module 314 can determine, based on a stored query, that the sub-portion of the statement "sum 10*$20" is an attempt to invoke a mathematical equation and can invoke the mathematical equation from a different program, if necessary. Apply component 310 can apply the equation and output component 306 can present to the user and/or the intended recipient the statement "I sold 10 painting and made $200." In accordance with some aspects, various characters or keystrokes can be utilized to invoke a query. Such keystrokes or combinations of keystrokes can be assigned automatically by system 300 and communicated to user or the user can manually assign keystrokes and/or combinations of keystrokes for various commands.

In accordance with some aspects, an input from the user can be a request to input a file, a picture, a video, a song, a webpage, other items, or sub-portions thereof, which are accessible and can be inserted within a document or other program (e.g., email, instant message, chat room, spreadsheet and so forth). The user can enter the request directly into user interface 308, which can provide a graphical user interface (GUI), a command line interface, a speech interface, Natural Language text interface, and the like. For example, a GUI can be rendered that provides a user with a region or means to read, make modifications to, or perform other actions to various applications associated with a current application or a different application. The result of various inputs by the user can be presented in regions or other areas of a display screen. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate information conveyance such as vertical and/or horizontal scroll bars for navigation and toolbar buttons to determine whether a region will be viewable can be employed. For example, the user can interact with a user interface 308 by entering the information into an edit control.

The user can also interact with the regions to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

A retrieval component 316 can be configured to identify the requested content and selectively retrieve the entire content (e.g., file) or sub-portions of the content (e.g., section of a file, video clip). For example, the content might be described with reference to a directory name, a name of the file or based on other criteria (e.g., personal webpage content, only content retained in a user's device, and so forth).

When a second user (or the same user) is reviewing the file that contains the requested content, the second user can automatically be presented with the content, which can be an entire file. The user might simply select the content, such as by highlighting an icon associated with the content and pressing the enter key or through various other selection techniques (e.g., voice command, clicking with a mouse, and so forth). Thus, content can be automatically applied to a current application by system 300 while mitigating the need for the user to actively search for the content.

Figure 4:
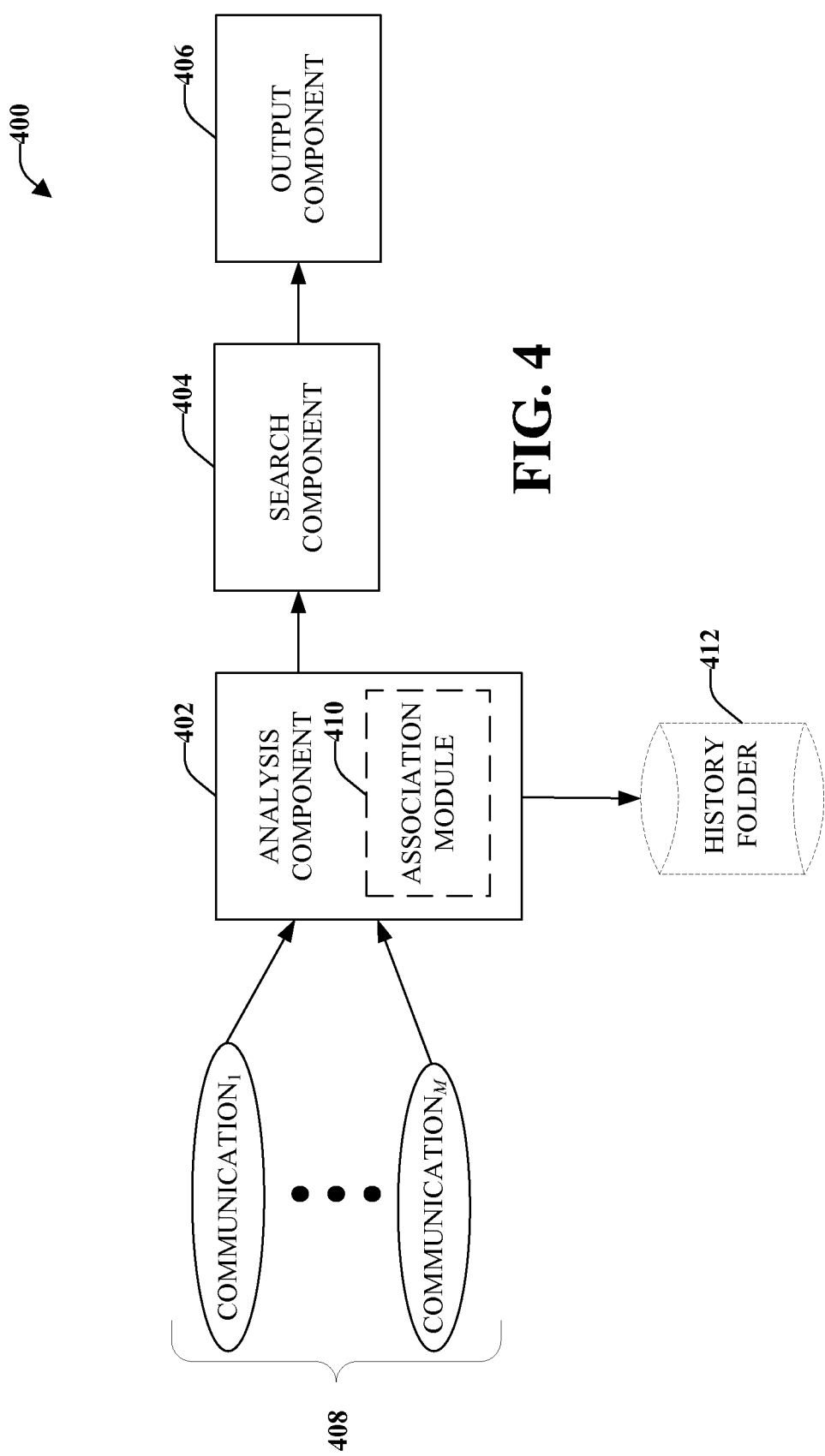
FIG. 4 illustrates an example system that can allow different modes of communication to be associated together.

With reference now to FIG. 4 illustrated is an example system 400 that can allow different modes of communication to be associated together. Sometimes a conversation can start in one mode of communication (e.g., text file, instant message, email, phone call, webcam, and so forth) and subsequent portions of the communication can continue in a mode different from the first mode of communication. System 400 can unify the communications such that when a search or other function is performed relating to the communications, each thread or communication in the chain is dynamically presented to the user, regardless of the mode in which the communication was received.

In this related aspect, system 400 includes an analysis component 402 that can be configured to evaluate one or more received communications, labeled 1 though M, where M is an integer. The communications can be referred to individually or collectively as communications 408. The communications 408 can be communications between two or more users and can represent different modes, communication means, or applications.

As the communications 408 are received, an association module 410 can be configured to evaluate each communication 408 and determine whether the communication 408 is related to another communication 408 previously received. The communications 408 can be received within a short time (e.g., minutes, hours, days) of each other or they might be received within a longer time (e.g., weeks, months, years). Association component 410 can be configured to determine links between inputs or communications 408 based on various information including a common subject line, keywords or phrases in a title or within the communication (e.g., text, spoken). The association might also be based on a manual entry indicating that two or more communications are related. For example, a user might reply to an email with a phone call and can manually tag that phone call as being related to the email. The tag can include a reference or other indicator associated with one or more communications 408.

In accordance with some aspects, analysis component 402 can output the communications to a history folder 412 or a storage media. The history folder 412 can include information relating to a single conversation and/or include all conversations that are related, regardless of the mode used to communication the conversation.

By way of example, and not limitation, history folder 412 can include nonvolatile and/or volatile memory. Suitable non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of example and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

When a user or other entity requests to access information associated with a communication, search component 404 can locate the communication and any related communications and output component 406 can dynamically present the results of the one or more communications in response to the request. The different communications 408 can be retained separately based on the mode of communication, a date of the communication or based on other factors (e.g., location where a user manually saved the communication).

The communications 408 can be presented by output component 406 to the user in response to the request. For example, the results can be presented in the order that the communications were received to provide the user with a logical association between the communications 408. In accordance with some aspects, output component 406 can display the communications 408 and corresponding modes and wait for a user selection before presenting the results of the communications 408. Thus, system 400 can dynamically capture communications that are related and present the corresponding communication information to a user upon request, regardless of the communication mode.

Figure 5:
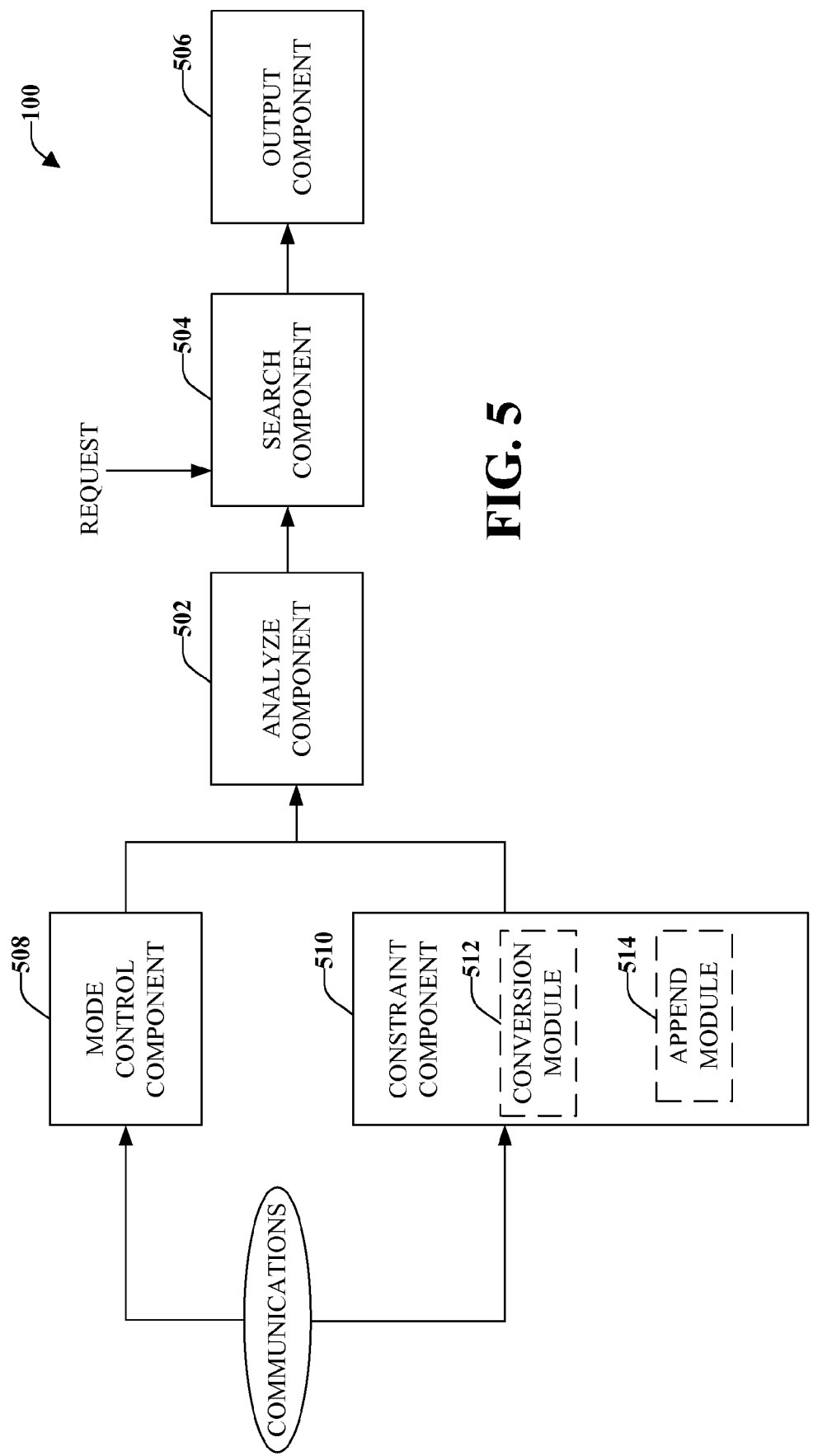
FIG. 5 illustrates an example system that provides tracking of different communication modes while allowing users to control various aspects of the communication.

Referring now to FIG. 5 illustrated is an example system 500 that provides tracking of different communication modes while allowing users to control various aspects of the communication. An analysis component 502 can analyze an incoming and/or an outgoing communication and determine whether the communication is related to another communication. The determination can be made based on various factors including keywords contained in the communication, a reference to an earlier communication, a subject line, a manual input, and so forth. If the communication is related to other communications, the two or more communications can be associated, such as by a link, thread or other means of establishing the association.

Later, when a request is received to review the communication, a search component 504 can search for the communication and any related communications and output component 506 can present the results to a user. The request can be a request to open a file, or can be inferred when a user views an email, or when other actions are performed (e.g., a search for a keyword or subject, a search for a user's name, a phone number search, and so forth).

For example, a user might desire to call an associate and performs a search to find a phone number within a contact list or other listing. Based on the input, search component 504 can obtain previous communications with the person associated with the phone number and the results can be presented to the user at substantially the same time as the phone number is presented and/or the call is automatically initiated. The information retrieved might notify the user of information that needs to be discussed between the parties and/or might relate to other information that user might find useful during the conversation.

A mode control component 508 can be associated with system 500 to allow one or more users to control the mode of communication. Control of a communication mode might be desired for sensitive issues, privacy reasons, or other reasons (e.g., user will only be available by phone). Mode control might also relate to the presence status of the user (e.g., away from office, away from desk, at home, busy, at lunch, and so on). Thus, a sender can send an email and, through mode control component 508 can require that the recipient responds in the same mode (e.g., email) or in a different mode (e.g., phone call, instant message, physical meeting). The mode can be controlled by either sender or recipient or both sender and recipient.

In accordance with some aspects, mode control component 508 can seamlessly escalate from one mode to another. For example, a user can be looking at an email and have an instant message application perform a function automatically that links the email and the instant message together.

Additionally or alternatively, a constraint component 510 can be included in system 500. Constraint component 510 can provide various constraints in addition to the mode of communication control. For example, a constraint can be that a telephone call must include a subject line or heading. If a telephone call is received without the subject line/heading, a request can be sent to the initiator for such information and/or the call might be denied. In accordance with another example, a sender might attempt to initiate a telephone conversation with a receiver, who is in a meeting. Receiver might have already notified constraint component 510 of the meeting and when the meeting will be over and request that any messages be sent through an instant message application. Constraint component, 510 can receive the phone communication and automatically notify sender that current communications must occur over an instant message application. Sender can comply with the request and/or wait until later to initiate the conversation. The constraints can be either sender initiated constraints and/or receiver initiated constraints. A compromise can be reached based on sender constraints and/or receiver constraints, which might include a conversation being continued or finished later.

In accordance with some aspects, constraint component 510 includes a conversion module 512 that can be configured to automatically convert one form of communication to another form. For example, conversion module 512 can automatically transform a phone conversation into an instant message application through utilization of a voice-recognition technique or other techniques. Other conversions can include but are not limited to, word processing application to audio communication conversion; email to instant message conversion, and so forth.

Additionally or alternatively, constraint component 510 can include an append component 514 that can be configured to apply various information or constraints across modes of communication. For example, when a user goes on vacation, an email message can be created to automatically reply to an incoming message. When an email message is received, the sender can be notified of the away status of the recipient. Additional information can be included in a notice, such as "For sales information talk to xx, for marketing information talk to yy". Append component 514 can be configured to apply the away status notice to other communication modes (e.g., phone message, instant message, and so forth). Append component 514 might also provide different messages to different people, depending on the constraints added by user.

Figure 6:
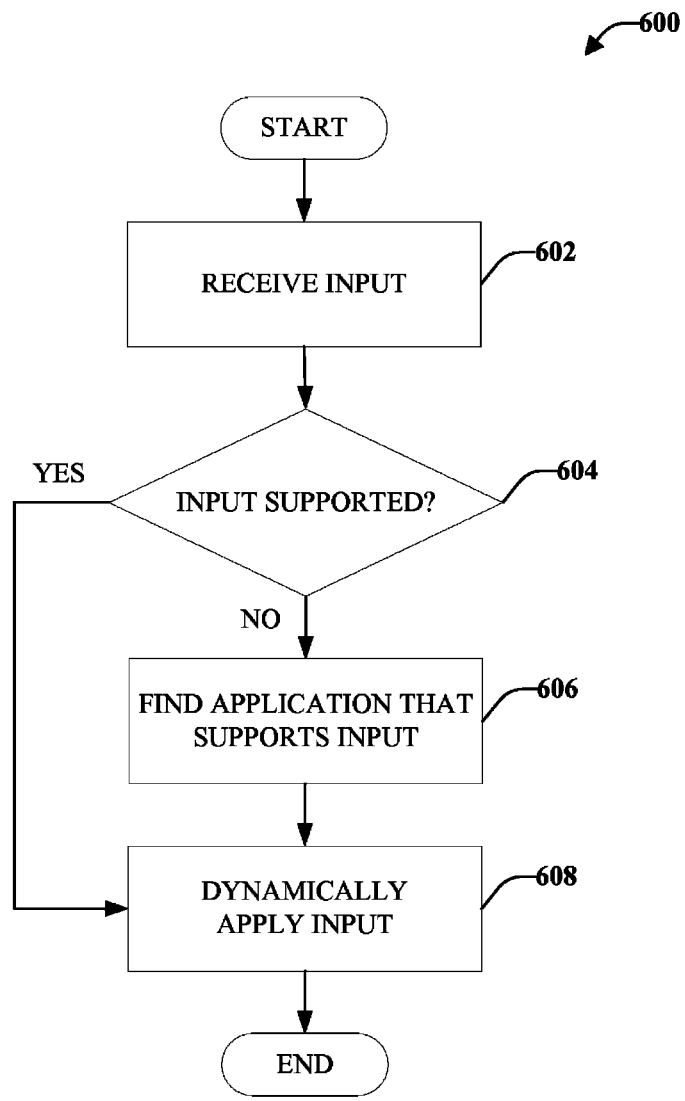
FIG. 6 illustrates a method for providing unified communications.
Figure 7:
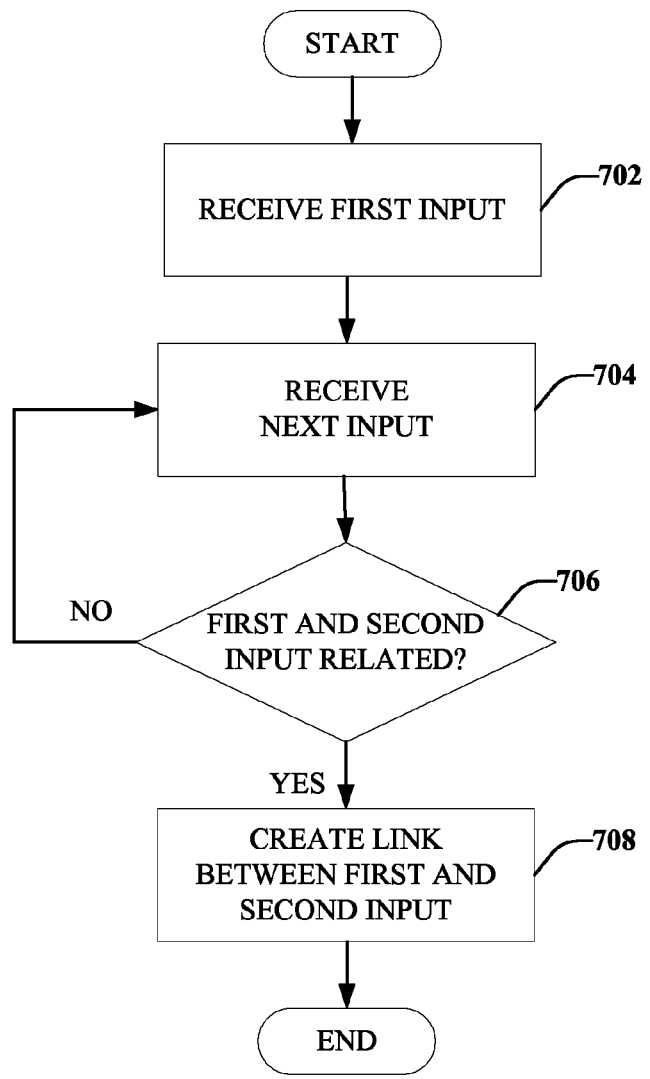
FIG. 7 illustrates a method for corresponding two or more communications that were sent and/or received by different modalities.
Figure 8:
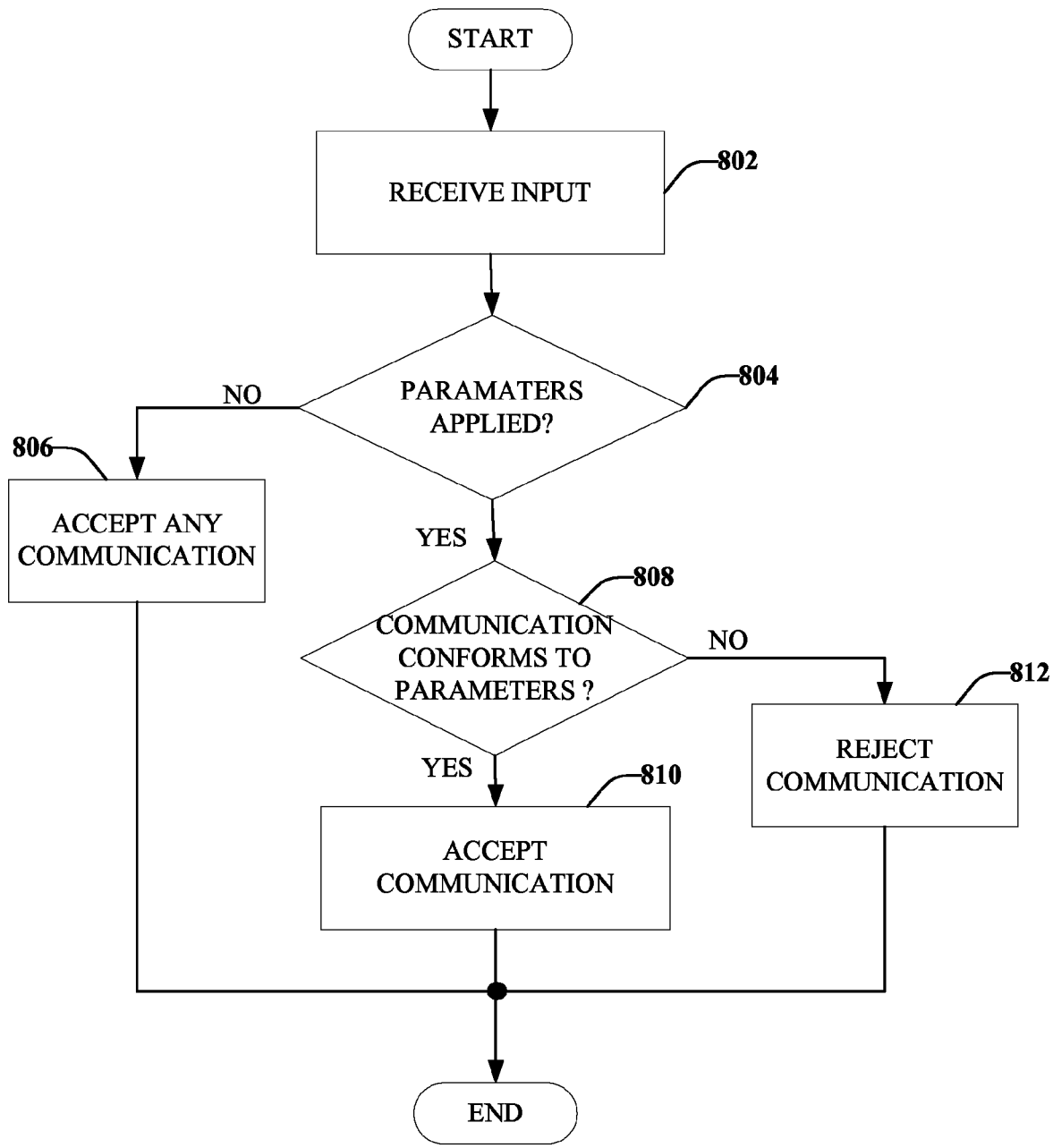
FIG. 8 illustrates a method for selectively controlling a mode of communication or other parameters associated with a communication.

In view of the exemplary systems shown and described above, methodologies that may be implemented in accordance with the disclosed subject matter, will be better appreciated with reference to the flow charts of FIGS. 6-8. While, for purposes of simplicity of explanation, the methodologies are shown and described as a series of blocks, it is to be understood and appreciated that the disclosed aspects are not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 6 illustrates a method 600 for providing unified communications. Sometimes when a user is utilizing an application there might be features from another application or program that the user wants to integrate in the current application. For example, a user might be creating a report and desires to find different words to use through utilization of a thesaurus. Method 600 allows the user to input a command or query in order to implement the desired function while mitigating the need for the user to manually access a different program.

At 602, an input is received from a user and/or entity. The input can be keystrokes or other inputs intended for the current application (e.g., entry of values and/or formulas in a spreadsheet application). However, one or more of the inputs could be a request for a function not supported by a current application (e.g., a calendar task in an instant message application, a statistical function in an email). At 604, a determination is made whether the received input relates to the current application. If the input does relate to the current application ("YES"), the method 600 continues by applying the input.

If the input does not relate to the current application ("NO") method 600 continues, at 606, with a search for an application or program that supports the received input. The determination might be based on various factors, including a format of the received input. For example, a certain query or structure of the input might be associated with various functions (e.g., "thesaurus: aggregate" or "like: aggregate" and so forth to invoke a thesaurus function). The formula or query can be predefined or manually defined by the user. The search can include applications and/or programs on a user device, over a network, accessed through the Internet, and so forth. If the program or application cannot be determined or found, a prompt or other message can be sent to the user for more information or an error message can be sent.

At substantially the same time as the application and/or program is discovered, its function corresponding to the input is dynamically applied and presented to the user, at 608. The function and output can be performed seamlessly and with little delay such that it can be transparent to the user.

FIG. 7 illustrates a method 700 for corresponding two or more communications that were sent and/or received through different modalities. In some situations, the modality utilized to send a communication is not the same modality in which the corresponding reply is received. For example, a phone call might be made by a supervisor to an employee requesting a status and a time that a report will be ready. If the employee is busy working on the report, the phone call might not be answered and a voice message might be left by the supervisor. When the employee takes a break, the message might be played back, however, since the employees is not yet finished, an email or text message might be sent in reply to avoid a conversation with the supervisor. The message might just indicate, "Will send out in 2 hours" without any other indications. Thus, when the report is not sent, the supervisor might have no record that it had been promised. Method 700 can dynamically associate both communications although they were sent using different forms of communication (e.g., modalities). Thus, a record can be maintained, searched, or referenced by either party.

Method 700 starts, at 702, when a first input is received (phone call in above example). The first input can be maintained in a file history or in another retrievable means. Key words, phrases, subjects, sender, recipient or other parameters can be utilized to categorize the first input. A subsequent input (e.g., text message in above example) is received, at 704, which can be received within close temporal proximity to the first input (e.g., seconds, minutes, hours) or at a remote temporal proximity (e.g., days, weeks, months, years).

At 706, a determination is made whether the inputs are related. The inputs can be automatically related based on various information including subject line, reference, key words or phrases and so forth. In accordance with some aspects, a user can manually associate inputs especially if there is no obvious linking (e.g., the text reply in the above example).

If the inputs are not related ("NO"), method continues, at 704, where a subsequent input is received. It is to be understood that this act can be recursive such that any number of inputs can be received and analyzed for relationships between the inputs. If the inputs are related ("YES"), at 708, a link or association is created between the inputs. When a particular input or communication is reviewed (e.g., a request is received to view either input), the linked communications are presented to the user, to provide the user with a history of the subject. The user can view the communications in the same mode in which the communications were received and/or can convert the communications to a different mode.

FIG. 8 illustrates a method 800 for selectively controlling a mode of communication or other parameters associated with a communication. At 800, an input is received, which can be bidirectional. That is to say, the input can be received from a sender and/or a recipient of a communication. At substantially the same time the input is received, a determination is made, at 804, whether parameters have been applied to the input. The parameters can include a particular mode that a response to a communication should utilize and/or constraints (e.g., communications must include a subject line).

If there are no parameters ("NO"), any subsequent communication can be received, at 806. That is to say, there are no constraints on incoming communications and, thus, all communications can be received at recipient's device. If there are parameters ("YES"), at 808, a determination is made whether the subsequent communication conforms to the parameters. If the communication is conforming ("YES"), the communication is automatically accepted, at 810. If the communication does not conform ("NO"), one or more constraints are violated and the communication is rejected, at 812. In accordance with some aspects, information can be forwarded to the sender of the communication advising of the parameters or constraints. In some aspects, an input can be automatically changed to a different modality in order to comply with mode requirements and selectively presented to the recipient of the communication.

It will be appreciated that, in accordance with one or more aspects described herein, inferences can be made regarding receiving multiple inputs in different communication modes, determining if two or more inputs are related, linking the inputs, applying a desired functionality, unifying two or more applications to achieve a desired outcome and so forth. As used herein, the term to "infer" or "inference" refers generally to the process of reasoning about or inferring states of the system, environment, and/or user from a set of observations as captured through events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Artificial intelligence based systems (e.g., explicitly and/or implicitly trained classifiers), rules-based logic systems or other machine learning techniques can be employed in connection with performing inference and/or probabilistic determinations and/or statistical-based determinations as in accordance with one or more of the disclosed aspects.

According to an example, one or more aspects presented above can include making inferences pertaining to a desired function and automatically applying the functionality from a different application to achieve the desired function. In accordance with another example, an inference can be made as to whether two or more inputs received in a same or different mode of communication are related to each other. It will be appreciated that the foregoing examples are illustrative in nature and are not intended to limit the number of inferences that can be made or the manner in which such inferences are made in conjunction with the various aspects described herein.

Figure 9:
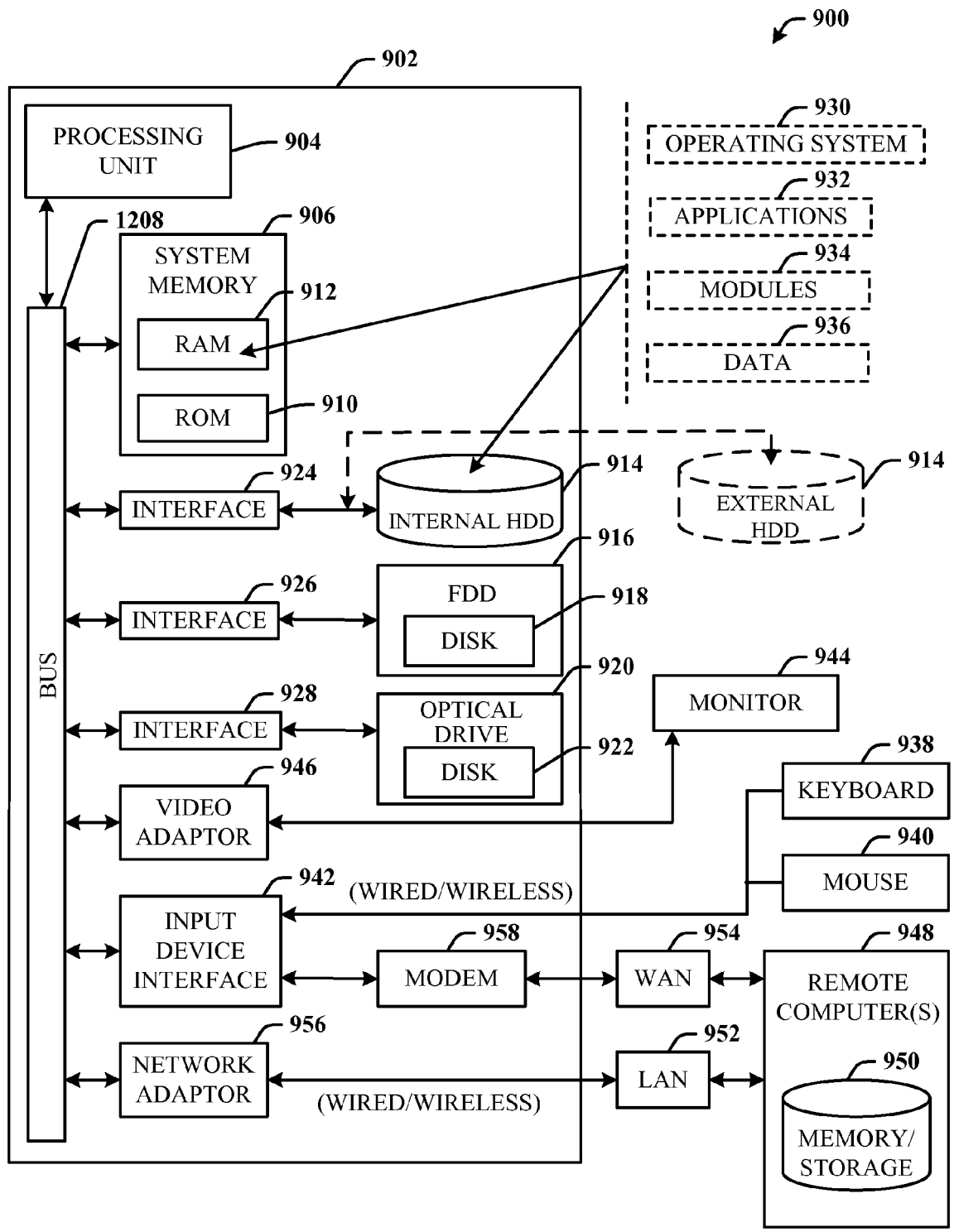
FIG. 9 illustrates a block diagram of a computer operable to execute the disclosed aspects.

Referring now to FIG. 9, there is illustrated a block diagram of a computer operable to execute the disclosed architecture. In order to provide additional context for various aspects disclosed herein, FIG. 9 and the following discussion are intended to provide a brief, general description of a suitable computing environment 900 in which the various aspects can be implemented. While the one or more aspects have been described above in the general context of computer-executable instructions that may run on one or more computers, those skilled in the art will recognize that the various aspects also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the one or more aspects.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the various aspects can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 through an interface, such as a video adapter 946. In addition to the monitor 944, a computer typically includes other peripheral output devices (not shown), such as speakers, printers, etc.

The computer 902 may operate in a networked environment using logical connections through wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 through the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
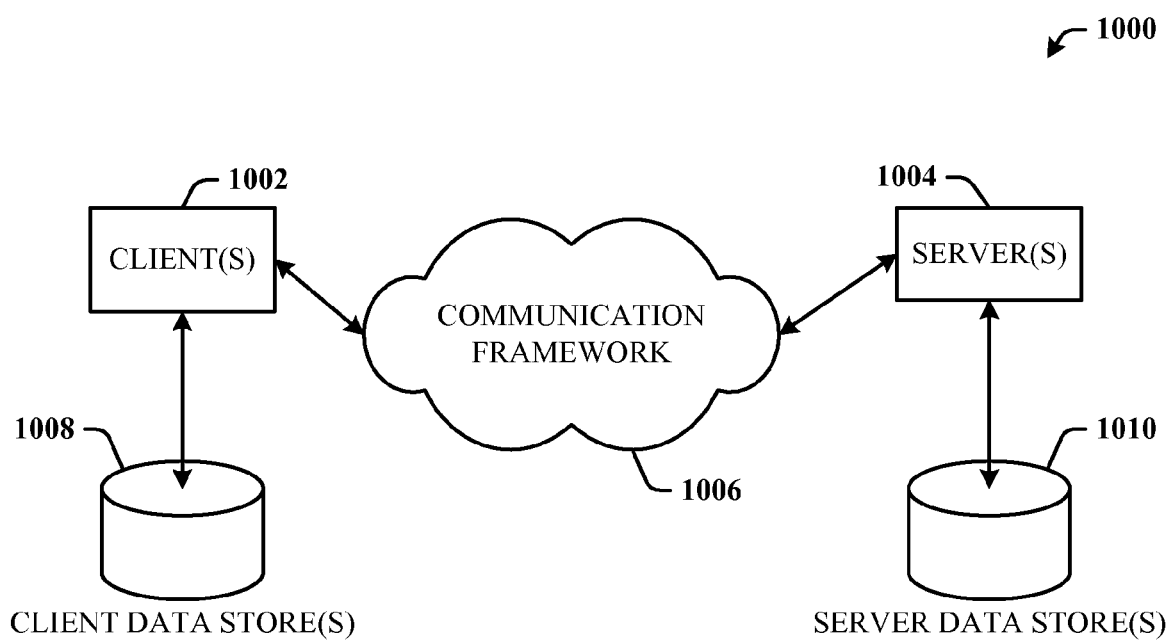
FIG. 10 illustrates a schematic block diagram of an exemplary computing environment operable to execute the disclosed aspects.

Referring now to FIG. 10, there is illustrated a schematic block diagram of an exemplary computing environment 1000 in accordance with the various aspects. The system 1000 includes one or more client(s) 1002. The client(s) 1002 can be hardware and/or software (e.g., threads, processes, computing devices). The client(s) 1002 can house cookie(s) and/or associated contextual information by employing the various aspects, for example.

The system 1000 also includes one or more server(s) 1004. The server(s) 1004 can also be hardware and/or software (e.g., threads, processes, computing devices). The servers 1004 can house threads to perform transformations by employing the various aspects, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated through a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." The term "or" as used in either the detailed description of the claims is meant to be a "non-exclusive or".

The word "exemplary" as used herein to mean serving as an example, instance, or illustration. Any aspect or design described herein as "exemplary" is not necessarily to be construed as preferred or advantageous over other aspects or designs.

Furthermore, the one or more aspects may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

What is claimed is:

1. A system comprising:
   one or more processors;
   memory, communicatively coupled to the one or more processors;
   an analyze component stored in the memory and executable by the one or more processors to:
      receive a message entered in a first application, wherein the message includes a functionality that is not supported by the first application;
      parse the message into a message portion or a function request portion;
      identify the functionality requested in the function request portion; and
      determine that the functionality requested in the function request portion is not supported by the first application;
   a search component stored in the memory and executable by the one or more processors to:
      in response to the determination that the functionality requested in the function request portion is not supported by the first application, search and analyze functionality of a plurality of other applications to dynamically select a second application that supports the functionality that is not supported by the first application; and
      access the second application in order to implement the functionality; and
   an output component stored in the memory and executable by the one or more processors to present the functionality in the message in the first application by applying the second application.

2. The system of claim 1, wherein the search component includes a listing of applications and related functions.

3. The system of claim 1, wherein the search component accesses the second application via a device, a network, an Internet, or combinations thereof.

4. The system of claim 1, further comprising a confirm module stored in the memory and executable by the one or more processors to solicit verification of whether an analysis of the message is correct.

5. The system of claim 1, further comprising:
   a formula module stored in the memory and executable by the one or more processors to correspond a user-selectable operation with a desired function; and
   an apply module stored in the memory and executable by the one or more processors to automatically apply the function based on the user-selectable operation included in the received message.

6. The system of claim 1, further comprising a query module stored in the memory and executable by the one or more processors to interpret a query included in the received message as a command to perform a particular operation.

7. The system of claim 1, wherein the analyze component further associates the message with an additional message.

8. The system of claim 7, wherein the analyze component associates the message and the additional message based on at least one of a keyword, a phrase, a subject matter, a manual entry, or combinations thereof.

9. The system of claim 7, wherein the search component gathers the message and the additional message and the output component presents both the message and the additional message to a user based on a request.

10. The system of claim 7, wherein the message and the additional message are retained in a history file.

11. The system of claim 1, further comprising a mode component stored in the memory and executable by the one or more processors to control a mode of communication for a subsequent message.

12. The system of claim 1, further comprising a constraint component stored in the memory and executable by the one or more processors to selectively apply a sender-constraint or a receiver-constraint to a subsequent message.

13. A method comprising:
   under control of one or more processors configured with executable instructions:
      receiving a first message that includes a format that is not supported by a current application and a second message;
      determining that the second message is related to the first message;
      dynamically associating the first message and the second message based on the determination;
      searching a plurality of other applications to dynamically select a second application that supports the format;
      converting the first message into a second format supported by the current application using the second application; and
      presenting full content of both the first message and the second message as a combined message when a request is received to view either the first message or the second message.

14. The method of claim 13, further comprising:
   receiving a constraint applied to either the first message or the second message; and
   accepting a subsequent message if the applied constraint is not violated.

15. The method of claim 13, further comprising:
   receiving a request for a subsequent message to be received in a defined modality;
   ascertaining whether the subsequent message is received in the defined modality; and
   selectively presenting the subsequent message.

16. The method of claim 15, wherein selectively presenting the subsequent message comprises transforming the subsequent message from a first modality to the defined modality.

17. The method of claim 15, wherein the subsequent message is rejected if not in the defined modality.

18. The method of claim 13, further comprising:
accessing a different application that supports a requested function; and
dynamically applying the different application via the current application to implement the requested function.

19. A computer-implemented system comprising:
a display area;
one or more processors; and
one or more computer-readable media maintaining instructions to be executed by the one or more processors to perform operations including:
receiving a first communication that includes a format that is not supported by a first application and a second message;
determining a relationship between the first communication and a second communication and associating the first and second communications if there is a relationship;
retrieving the associated communications in response to a request for at least one of the received communications;
searching a plurality of other applications to dynamically select a second application that supports the format;
converting the first communication into a second format supported by the first application using the second application; and
concurrently presenting the first and second communications on the display.

20. The computer-implemented system of claim 19, the operations further comprising:
establishing a preferred format of the first communication; and
selectively displaying at least one subsequent communication based on the established preferred format.

* * * * *